United States Patent [19]

Lenhardt

[11] Patent Number: 4,804,081

[45] Date of Patent: Feb. 14, 1989

[54] APPARATUS FOR A SLIPLESS CONVEYANCE OF DISCRETE ARTICLES

[75] Inventor: Karl Lenhardt, Neuhausen-Hamberg, Fed. Rep. of Germany

[73] Assignee: Lenhardt Maschinenbau GmbH, Neuhausen-Hamberg, Fed. Rep. of Germany

[21] Appl. No.: 925,615

[22] Filed: Oct. 31, 1986

[30] Foreign Application Priority Data

Nov. 11, 1985 [DE] Fed. Rep. of Germany ....... 3539876

[51] Int. Cl.⁴ .................... B65G 17/46; B65G 47/91
[52] U.S. Cl. .................. 198/689.1; 198/817; 198/842; 271/197; 271/276
[58] Field of Search .............. 198/689.1, 817 X, 842, 198/644, 833, 803.5, 811; 271/276 X, 197 X

[56] References Cited

U.S. PATENT DOCUMENTS

| 3,197,201 | 11/1960 | Craig | 198/688.1 X |
| 3,198,517 | 11/1962 | Martin | 271/197 |
| 3,282,586 | 9/1964 | Schwebel | 198/689.1 X |
| 3,627,108 | 12/1971 | Hansen | 198/817 X |
| 3,952,861 | 4/1976 | Holmquist et al. | 198/842 X |
| 4,411,420 | 10/1983 | Louis et al. | 271/276 |
| 4,555,013 | 11/1985 | Franklin | 198/689.1 |

Primary Examiner—Robert J. Spar
Assistant Examiner—Jennifer L. Doyle
Attorney, Agent, or Firm—Balogh, Osann, Kramer, Dvorak, Genova & Traub

[57] ABSTRACT

The apparatus comprises a vacuum channel (15), and two parallel endless belts (3), which extend on opposite sides of said vacuum channel. The working courses (3a) of said belts have forward surfaces which extend substantially in a common plane (6). The belts (3) are synchronously driven in the same direction. The vacuum channel is provided on the forward side of an elongate carrier (1) and communicates through at least one suction port (21) with a vacuum source. The working course (3a) of each of said belts (3) is in contact on the rear with backing rollers (14).

34 Claims, 11 Drawing Sheets

APPARATUS FOR A SLIPLESS CONVEYANCE OF DISCRETE ARTICLES

BACKGROUND OF THE INVENTION

1. Field of the Invention

This invention relates to apparatus for a slipless conveyance of discrete articles, particularly of glass plates, especially in an inclined, vertical or approximately vertical position, wherein a vacuum channel is provided on the forward side of an elongate carrier and is open to a predetermined plane of travel and communicates through at least one suction port with a vacuum source, two parallel endless belts are disposed on opposite sides of said vacuum channel and have forward surfaces which define said plane of travel, and drive means are provided for driving said belts at the same velocity in the same direction.

2. Description of the Prior Art

Such apparatus has been described in German Patent Application No. P 35 29 892.8 and the corresponding U.S. patent application Ser. No. 768,020 filed Aug. 21, 1985. In that prior apparatus the vacuum channel is divided into a plurality of vacuum chambers by cross-ribs, which are set back from the plane of travel, and at least some of said vacuum chambers communicate through at leat one suction port with a vacuum source.

In that prior apparatus it is assumed that the discrete articles to be conveyed consist of plates. When such plates are in contact with the endless belts, the plates will be sliplessly retained on the belt by the vacuum which is established in the vacuum chambers as the plates are moved over the vacuum chambers. The retaining force exerted on a given plate by the vacuum chambers is determined by the number of vacuum chambers which are closed by said plate at a given time. Said retaining force is taken up by the belts and for this reason the pulling or working courses of said belts of the prior apparatus extend in respective, longitudinally extending shallow grooves, which are formed in a beam that is provided with the vacuum passage, which is disposed between the working courses of the two belts. Because the belts ae guided in grooves disposed on opposite sides of the vacuum channel, air cannot undesirably flow into the vacuum channel past said belts when the latter are covered by a plate which is being sucked.

But a disadvantage of the prior apparatus resides in that the power required to convey the plates increases strongly with the size of each plate because the retaining force, which increases with the plate size, will force the belts into the grooves for guiding the belts so that considerable friction forces will act between the belts and the grooves.

SUMMARY OF THE INVENTION

It is an object of the invention so to improve an apparatus which is of the kind described first hereinbefore that a smaller force will be required to convey the discrete articles.

That object is accomplished in accordance with the invention in that the working course of each of said belts is backed by rollers.

Desirable further improvements within the scope of the invention will be recited in the dependent claims.

In the apparatus in accordance with the invention the two belts which extend along the vacuum channel on opposite sides thereof and take up the vacuum force are no longer in sliding contact with the carrier in long grooves, which are formed in the carrier that is provided on its forward side with the vacuum channel, but the working course of each belt is backed by rollers so that said courses are subjected to rolling rather than sliding friction. As a result the pulling force required to convey discrete articles to which a vacuum is applied is much smaller than in the prior apparatus, which is thus improved in accordance with the invention. The invention is based on the recognition that the vacuum channel can be sufficiently sealed on both longitudinal sides so as to maintain an adequate vacuum and the forward surface of the belts, which surface is to define the plane of travel, can be maintained in a given plane even if the belts are not guided with a small tolerance in a groove and in sliding contact therewith, as is described in U.S. patent application Ser. No. 768,020. That object will also be accomplished if the working course of each belt is backed by rollers because the forward surface of the working course can readily be maintained in the desired position if the working course is backed by a plurality of rollers, if they are not excessive in size and are arranged in a row and sufficiently closely spaced apart and the belts are tensioned over said rollers, and because the required sealing of the vacuum channel on its longitudinal sides can be achieved, e.g., in that the vacuum passage is defined on both sides by the two belts in such a manner that that side face of the working course of each belt which faces the vacuum channel adjoins a longitudinally extending side wall or side rib of the carrier. Whereas similar means defining the vacuum channel are disclosed in the prior U.S. patent application Ser. No. 768,020, the belts used in that prior apparatus are relatively flat belts. In the known apparatus such belts ensured an adequate seal because an ingress of air into that portion of the vacuum channel which was covered by a plate to be conveyed was possible only if that air flowed on the longitudinal sides of the vacuum channel over the rear side of said belt through the gap between the rear course of the belt and the groove. On the other hand, in one embodiment of the apparatus in accordance with the invention a seal is established in that one side face of the working course of each belt adjoins a longitudinally extending side wall or side rib of the carrier so that only air which flows through the gap between the belt and said longitudinally extending side wall or side rib of the carrier can enter the vacuum channel. In that embodiment an adequate seal can be obtained in that said gap is sufficiently narrow and the flow path is sufficiently long. To that end a flat belt may be replaced by a relatively thick belt. The sealing action can be increased in that a labyrinth seal is provided between the side wall or side rib of the carrier and the belt and for this purpose said side wall is formed with longitudinal grooves, which increase the resistance to flow.

The vacuum channel can alternatively be sealed on opposite sides in that the vacuum channel is not defined by the two belts, as was proposed before, but is defined by two side walls or side ribs which adjoin the plane of travel and the working course of each belt extends on the outside of one of said side walls or side ribs. In that case a seal will be achieved because the clearance between the side walls or side ribs and the planes of travel is minimized so that any air which tends to enter the vacuum channel from the side thereof must squeeze itself through the narrow air gap which exists between the side walls or side ribs and the adjacent surface of a discrete article to which a vacuum is applied. The sealing action of such air gap can be assisted in that the clearance between the working course of each belt and the adjacent side wall or side rib which defines the vacuum channel is minimized. But in that embodiment of the invention the belts may alternatively be substantially spaced apart from the side walls or side ribs and only the latter may be relied upon to seal the vacuum channel on its sides. Because the side walls or side ribs are used to seal the vacuum channel, the arrangement of the belts and of the means for guiding the belts may be more freely selected and worn belts can easily be replaced; this is also an advantage over the prior apparatus. The seal can also be improved in that the side walls or side ribs are formed with longitudinal grooves either on that surface of the side wall or side rib which faces the plane of travel in order to provide a labyrinth seal between the side wall or side rib and the discrete articles being conveyed, and/or in that side face of the side wall or side rib which faces the working course of the adjacent belt in order to provide a labyrinth seal between the side wall or side rib and said working course.

The seal on the sides of the vacuum channel can desirably be improved by longitudinal extending, flexible sealing elements, which extend along and are secured to the carrier and extend along the same between the vacuum channel and the working course of each belt. Said sealing elements may consist, e.g., of a strip, which carries bristles, which are directed toward the plane of travel and in a relaxed condition extend at least as far as to the plane of travel so that they will restrict the flow. Alternatively the sealing element may consist of a longitudinally extending, flexible sealing lip, which is directed toward the plane of travel and in a relaxed condition protrudes beyond said plane of travel so that the lip will contact undr a certain pressure a discrete article to which a vacuum is applied. If the sealing lip in a relaxed state is curved toward the adjacent belt, the vacuum which is applied from the vacuum channel to the discrete article being conveyed will force said article against the sealing lips.

A particularly effective seal will be obtained within the scope of the invention if the vacuum channel is defined on its longitudinal sides by respective side ribs, which protrude toward the adjacent plane of travel and extend almost to the plane of travel, each of said side ribs is adjoined by a flange, which extends along the adjacent belt and is disposed on that side of the side rib which is remote from the vacuum channel, the forward face of said flange is also close to the adjacent plane of travel, each of the belts is provided on its forward surface with a longitudinally extending step at least in that portion of the belt which is adjacent to the vacuum channel, the forward surface of said step on the working course defines the plane of travel, and the marginal strip which is set back on each belt from said forward surface of the step has a forward surface in contact with the rear surface of one of said flanges. Each belt is preferably provided with two of such steps so that the belt is provided on its forward surface with a central rib and two setback marginal strips. A bar secured to the carrier and extending along the belt is associated with that marginal strip of the belt which is remote from the vacuum channel. The forward surfaces of said two bars are also closely spaced from the plane of travel on the rear thereof and the rear side of each of said bars is in contact with the second marginal strip of the associated belt, i.e., of that marginal strip which is remote from the vacuum channel.

Said marginal strips of the belts act like a sealing lip and by the vacuum generated in the vacuum channel said marginal strips, particularly the two marginal strips which are adjacent to the vacuum channel, are forced against the rear surfaces of the flanges. Under the action of the vacuum applied to the discrete element, the latter applies an opposing pressure to the rib of the working course of each belt, which rib slightly protrudes beyond the forward surfaces of the flanges. Owing to said opposing pressure the marginal strips of the working courses of the belts will not be forced too strongly against the rear sides of the flanges. Owing to that extremely flavorable coaction of the pressure and opposing pressure, the vacuum channel will tightly be sealed on its sides and the friction between the belts and the flanges will be small so that even discrete elements which are large in size can reliably be retained on the belts and can be conveyed by a small force. Even heavy glass plates having an area of a plurality of square meters can reliably be held in a vertical orientation in such apparatus within the scope of the invention and the force required to move such glass plates will be so small that the glass plates can easily be displaced by hand when the belts are inoperative. This is not possible in a comparable apparatus which is known in the art because in said known apparatus the application of the vacuum to the large glass plates creates a frictional resistance which can be overcome only with very great difficulty.

In another embodiment one of the bars which are remote from the vacuum channel may be replaced by a plurality of rollers, which are arranged in a row and have axes which are at right angles to the plane of travel, and said rollers have peripheral surfaces protruding beyond the plane of travel and have a side face which is disposed behind the plane of travel and in contact with the forward surface of the adjacent marginal strip of the working course of the adjacent belt. That embodiment will be particularly suitable for conveying discrete platelike elements in a vertical or inclined orientation and in that case the rollers may be used to support the plates at their bottom edge and will prevent a falling of the plates in case of a sudden pressure rise in the vacuum passage.

The protruding portion or rib of each belt preferably consists of a material which differs from the material of the marginal strips. The protruding portion or rib of each belt should have a forward surface which has a high coefficient of friction so as to promote a slipless conveyance of the discrete elements. In order to ensure a travel of the belts with a minimum of friction, the coefficient of friction of the marginal strips should be as small as possible.

In order to minimize the ingress of air in the direction of travel of the belts into that region of the vacuum channel which is disposed behind a discrete article to which a vacuum is applied, the vacuum channel is subdivided into a plurality of vacuum chambers, suitably by the provision of crossribs, which extend transversely to the longitudinal direction and terminate at or short of the plane of travel, and each of said vacuum chambers communicates through at least one suction port with the vacuum source. Such an arrangement has also been adopted in the prior apparatus mentioned above. The total retaining force which is exerted on the discrete articles from the vacuum chambers will depend on the number of vacuum chambers which are covered by a discrete article at a given time. The crossribs should extend as close as possible to the plane of travel of the apparatus so that the clearance between said crossribs and the discrete article subjected to the vacuum will be minimized. But on the other hand the article subjected to the vacuum should not be urged against the crossribs. For this reason the crossribs are preferably so arranged that a plane which extends in the longitudinal center line of said crossribs and at right angles to the direction of travel contains the axes of a pair of rollers backing the belts so that those portions of the belts which are aligned with the crossribs are optimally backed and there is no risk that the discrete article may be urged against one of the crossribs when a belt yields to the force that is exerted by the vacuum being applied.

The forward faces of the side ribs defining the vacuum channel and the forward faces of the crossribs by which the vacuum channel is subdivided will suitably lie in a common plane and said plane is preferably spaced between 0.5 mm and 0.8 mm from the plane of travel. The vacuum channel should have a larger depth amounting to between 5 mm and 10 mm, preferably 8 mm, from the plane of travel which is defined by the forward surfaces of the belts. With that distance between the plane of travel and the bottom of the vacuum channel it will be ensured that the rate at which air can be sucked from the vacuum channel exceeds the rate at which air can flow into the vacuum channel between the belts and the carrier which is provided with the vacuum channel on its forward side.

A valve member suitably consisting of a valve cone is preferably provided in the carrier behind each suction port. Said valve members should be mutually independently operable to close the suction ports. In that case those suction ports which are not covered by discrete elements being conveyed at a time can be closed. This will afford the advantage that the evacuation rate of the vacuum-applying system will be reduced and the lower evacuation rate will involve a lower frictional resistance, particularly if the discrete elements being conveyed cover a relatively large number of suction ports of the vacuum channel. Because it is difficult to automatically control the evacuation rate of evacuating fans, the evacuation rate of the fan must be sufficient for the exertion of an adequate retaining force even on discrete elements which cover only a few suction ports so that a correspondingly higher frictional resistance will be encountered during the conveyance of larger discrete elements. This can be avoided by the individually operable valve members disposed behind respective suction ports.

The rollers backing the working course of each belt are suitably arranged in a row on each side of the carrier, which is provided on its forward side with the vacuum channel, and said rollers are suitably closely spaced apart in each row. The rollers suitably consist of identical, freely rotatable rollers in contact with the working course of the adjacent belt. Each endless belt is trained around two belt pulleys, one of which is suitably mounted to be adjustable for tensioning the belt whereas the other belt pulley is adapted to be driven. Instead of rollers which are individually mounted on the carrier, a roller chain may be used to back the working course of each belt. For that purpose the forward course of said chain is arranged to extend parallel to the direction of travel of the associated belt and is backed at its link plates on the rear. Said backing on the rear need not be effected by a row of rollers but may be effected by a portion of the carrier which is provided with the vacuum channel on its forward side, or by a bar which is rigidly connected to the carrier and parallel to the direction of travel. The chain suitably consists of an endless chain, which is trained around two sprockets, one of which must be adjustably mounted so that it can be used to tension the chain. A separate driven belt pulley is provided for driving the belt which is backed by the chain and said driven belt pulley is disposed outside the area that is enclosed by the endless chain and precedes said chain when viewed in the direction of travel of the apparatus. At the other end of the endless belt, the latter may be trained around the chain as it is trained around the other chain sprocket. To permit the chain and belt to be tensioned independently of each other, the two chain sprockets are suitably adjustable independently of each other.

A non-driven roller chain constitutes low-cost means for a low-friction support of each revolving belt.

Because the width of the link plates of a roller chain exceeds the diameter of its rollers, a roller chain may also be used for a lateral guidance of a belt which is backed by the chain. If such belt is supported by a row of rollers which are individually mounted on the carrier that is provided with the vacuum channel rather than by a roller chain, other means must be provided for a lateral guidance of the belt. The lateral guidance might be provided in that the rollers are arranged in a recess that is formed in the carrier which is provided with the vacuum channel and side face portions of such slot or groove are relied upon for the lateral guidance of the belt. But a belt can be guided in a more favorable manner and with lower friction if the backing rollers consist of belt pulleys, each of which has a peripheral recess which receives the working course of the revolving belt. A particularly exact guidance of the belts will be obtained and their adjustment will be facilitated if the belts consist of vee belts and the backing rollers consist of mating vee belt pulleys.

Various cross-sectional shapes can be selected for the belts, which may be circular, rectangular or particularly trapezoidal (vee-shaped) in cross-section. It will be particularly desirable to provide belts which are tee-shaped in cross-section and in which the leg of the tee is vee-shaped, like a vee belt, whereas the crosspiece of the tee is preferably wider than the individually mounted rollers or than the roller chain so that the crosspiece can be used to additionally support the belt on the flanges of a profiled roller, such as a vee belt pulley, and the side face of the belt can adjoin the boundary of the vacuum channel so that said channel can be sealed by means of the side face of the belt.

It will be particularly preferred to use toothed belts having teeth formed on the crosspiece of the tee section. Such toothed belts can move without a slip around a driven belt pulley. To ensure that the toothed belt will not be distorted as it is driven, the teeth are suitably provided on the crosspiece of the tee on both sides of the leg of the tee and the belt pulley is provided with two corresponding circular series of teeth. No teeth are required on the rollers backing the working course but said rollers are narrower than the belt pulleys and the width of the rollers equals the width of the belt portion disposed between the series of teeth.

The apparatus in accordance with the invention may be used to cnvey discrete articles of various kinds, particularly glass plates, and for a conveyance of glass plates which have a large area and are heavy in weight a plurality of such conveying apparatus defining a common plane of travel may be incorporated in a unit in which they are parallel and juxtaposed so that a vacuum can be applied to a large plate in different portions of its surface and such plate can be conveyed by said plurality of conveying apparatuses moving in unison. Alternatively, a conveying apparatus in accordance with the invention may also be used to convey articles which are small and light in weight, such as covers for containers. The apparatus may also be used to convey other than platelike articles, provided that they have a sufficiently large surface to which a vacuum can be applied from the vacuum channel. The apparatus in accordance with the invention can be used to special advantage for the conveyance of articles, particularly plates, in a vertical or approximately vertical orientattion because the articles can be retained on the belts under the action of the vacuum applied to the articles but the articles need not rest at their bottom edges or surfaces on the belts.

BRIEF DESCRIPTION OF THE DRAWINGS

FIG. 4b illustrates on an enlarged scale a further modification of the detail "Y" of the FIG. 4 embodiment.

DETAILED DESCRIPTION OF THE PREFERRED EMBODIMENTS

Illustrative embodiments of the conveying apparatus in accordance with the invention are diagrammatically shown in the accompanying drawings.

For the sake of simplicity, identical or corresponding components of the various illustrative embodiments are designated with the same reference numerals.

In the illustrative embodiment shown in FIGS. 1 to 5 the conveying apparatus comprises a carrier 1, which consists of a box-section beam, which is closed at both ends and is provided on its rear side with two attached tubular ports 2, which are connected to the suction side of a fan, not shown. Whereas the box-section beam 1 shown in FIGS. 1 to 5 is integral in cross-section, said beam may alternatively consist of a forwardly open channel member which is closed on its forward side by a plate which is welded to the channel member. Two endless belts 3 extend on opposite longitudinal sides of the box-section beam and are trained each around two belt pulleys 4 and 5, which are mounted on the box-section beam 1 or on brackets which are secured to the box-section beam. The belt pulleys 4 and 5 are so arranged that the working course 3a of each belt is parallel to the forward surface of the box-section beam 1 and protrudes slightly, preferably between 0.5 mm and 1 mm, beyond the forward edges of the box-section beam. The forward surfaces of the working courses 3a of the two belts define a common plane, which is described as a plane of travel 6.

To permit a tensioning of each belt 3, one of the two belt pulleys, specifically the belt pulley 4, is secured to a bracket 7, which is fixed to the box-section beam 1 by screws 8 that extend through slots 9 of the bracket 7. As a result, the bracket 7 can be adjusted along the box-section beam 1 to an extent that is defined by the slots 9. That adjustment is effected by means of a tensioning screw 10, which bears on the adjacent end face of the bracket 7 (FIG. 5) and is screwed into a tapped block 11 that is welded to the box-section beam 1.

To permit the two belts 3 to be tensioned independently of each other, the two belt pulleys 4 disposed at one end of the box-section beam 1 are mounted on separate shafts 12 rather than on a common shaft. The belt pulleys 5 mounted at the opposite end of the box-section beam are not mounted to be adjustable along the box-section beam and are secured to a common drive shaft 13 and synchronously driven by a motor, not shown.

Between the belt pulleys 4 and 5, identical rollers 14 are mounted on the box-section beam 1 on each side thereof and are freely rotatable about axes which are parallel to those of the belt pulleys 4 and 5. The rollers 14 are closely spaced apart and back the working course 3a of the adjacent belt. The rollers 14 on each side of the box-section beam 1 are arranged in a straight row and jointly with the belt pulleys 4 and 5 define the path for the working course 3a of the adjacent belt so that the forward surface of said belt will lie throughout its length in a plane, which constitutes the plane of travel 6 of the apparatus.

Each belt 3 consists of a vee belt and the belt pulleys 4 and 5 and the backing rollers 14 consist of vee belt pulleys, in which the belt 3 is received without a backlash. Each belt 3 is tee-shaped in cross-section and the crosspiece of the tee is wider than the backing rollers 14 and just as wide as the belt pulleys 4 and 5 so that the crosspiece of the tee can bear on the end flanges of the pulleys 4, 5 and of the rollers 14. This will permit an exact positioning of the forward surfaces of the belts 3 relative to the forward surface of the box-section beam 1.

The forward surface of the box-section beam defines a vacum channel 15, which is open to the plane of travel 6. That vacuum channel is defined on its longitudinal sides by the two belts 3. The vacuum chanel 15 is divided in length by crossribs 19, which extend transversely to the direction of travel 18 and have an outside surface which is slightly behind the outside surfaces of the working courses of the belts. A suction port 21 is disposed at the center of each chamber 20 which is defined by the belts 3 and crossribs 19 and connects said chamber 20 to the interior 22 of the box-section beam 1, from which air is sucked through the tubular ports 2. As a result, the interior 22 of the box-section beam constitutes a vacuum source for the chambers 20 disposed on the forward side of the beam so that said chambers can be described as vacuum chambers and in their entirety constitute the vacuum channel 15 of the apparatus embodying the invention.

A discrete article, such as a glass plate 23, which is to be conveyed by such apparatus, will be applied to the working courses 3a of the two belts and will be sucked by the vacuum which is quickly established between the glass plate 23 and the box-section beam 1 so that the glass plate 23 can be conveyed without a slip. The vacuum chambers 20 are preferably so dimensioned that a plurality of said chambers are covered by a glass plate 23. Conveyors which are suitable for a conveyance of glass plates are suitably provided with vacuum chambers which are defined by crossribs 19 which have a length of 15 cm to 20 cm and in the intermediate portion of the length of the conveying apparatus are spaced 15 cm to 20 cm apart whereas their spacing at each end of the box-section beam 1 is only 5 cm to 10 cm so that the glass plates will be conveyed without a slip even at the ends of the conveying apparatus.

Owing to the provision of the crossribs 19 the required and desired vacuum will be maintained at least in those vacuum chambers 20 which are disposed in the intermediate portion of the length of the box-section beam 1 and are covered by a glass plate 23. To provide a seal on the longitudinal sides, the belts 3 are spaced as closely as possible from the side walls of the beam 7 so that air tending to enter the vacuum channel from its longitudinal side must squeeze itself through a very narrow gap between the belt 3 and the side wall of the beam 1, so that flow of air into the vacuum chamber 20 is minimized.

Figure 4:
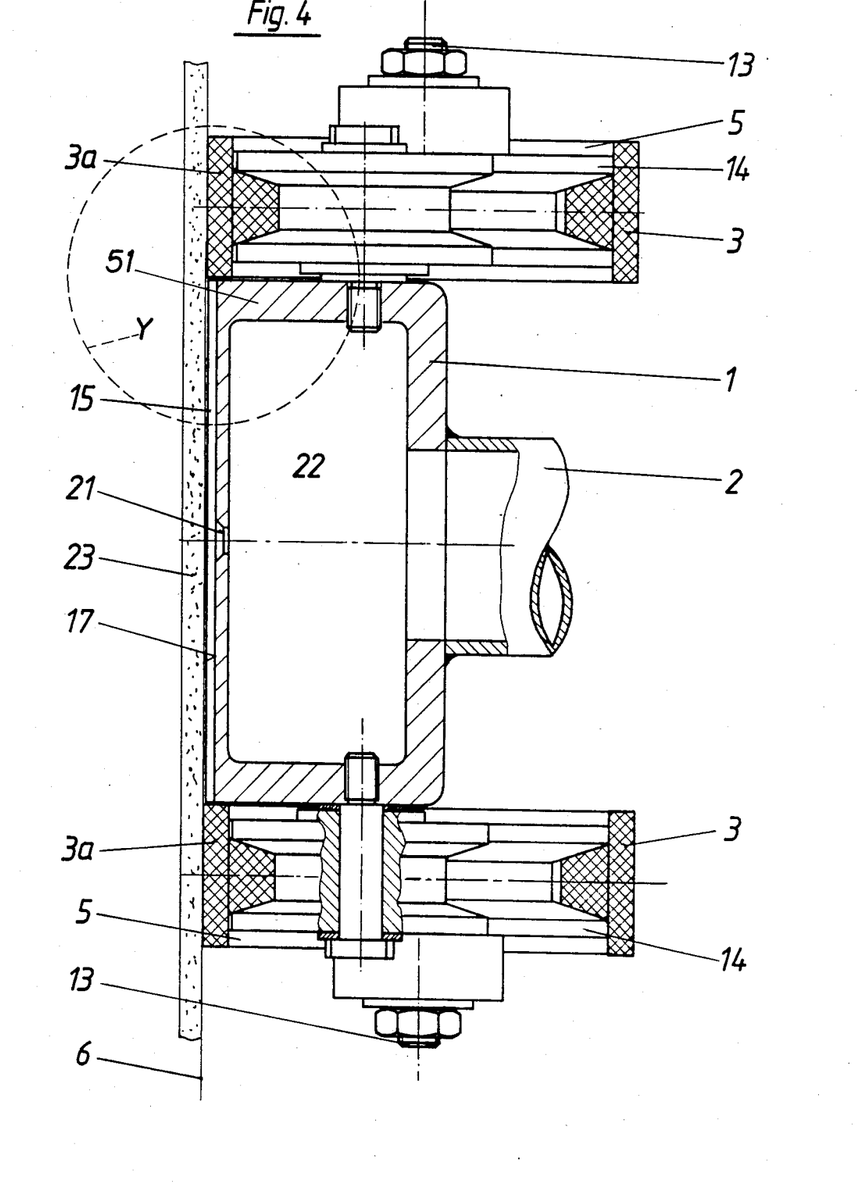
FIG. 4 is a sectional view taken on line IV—IV in FIG. 1.
Figure 4A:
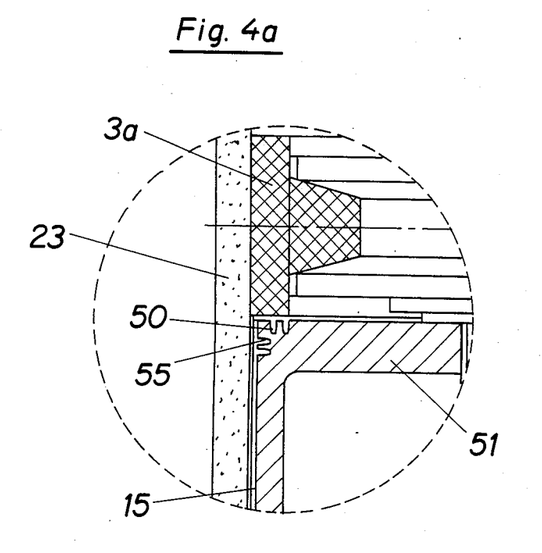
FIG. 4a illustrates on an enlarged scale a modification of the detail which is shown in FIG. 4 in the circle Y
Figure 5:
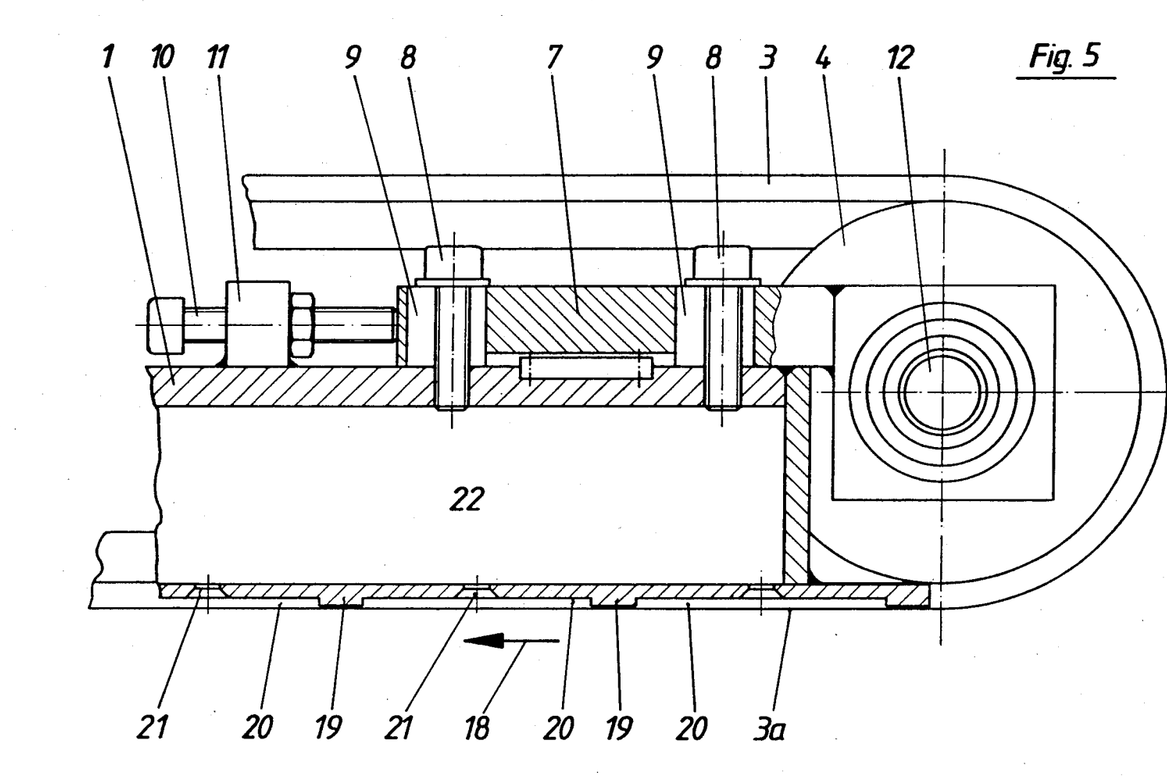
FIG. 5 is a longitudinal sectional view taken on line V—V in FIG. 1.
Figure 6:
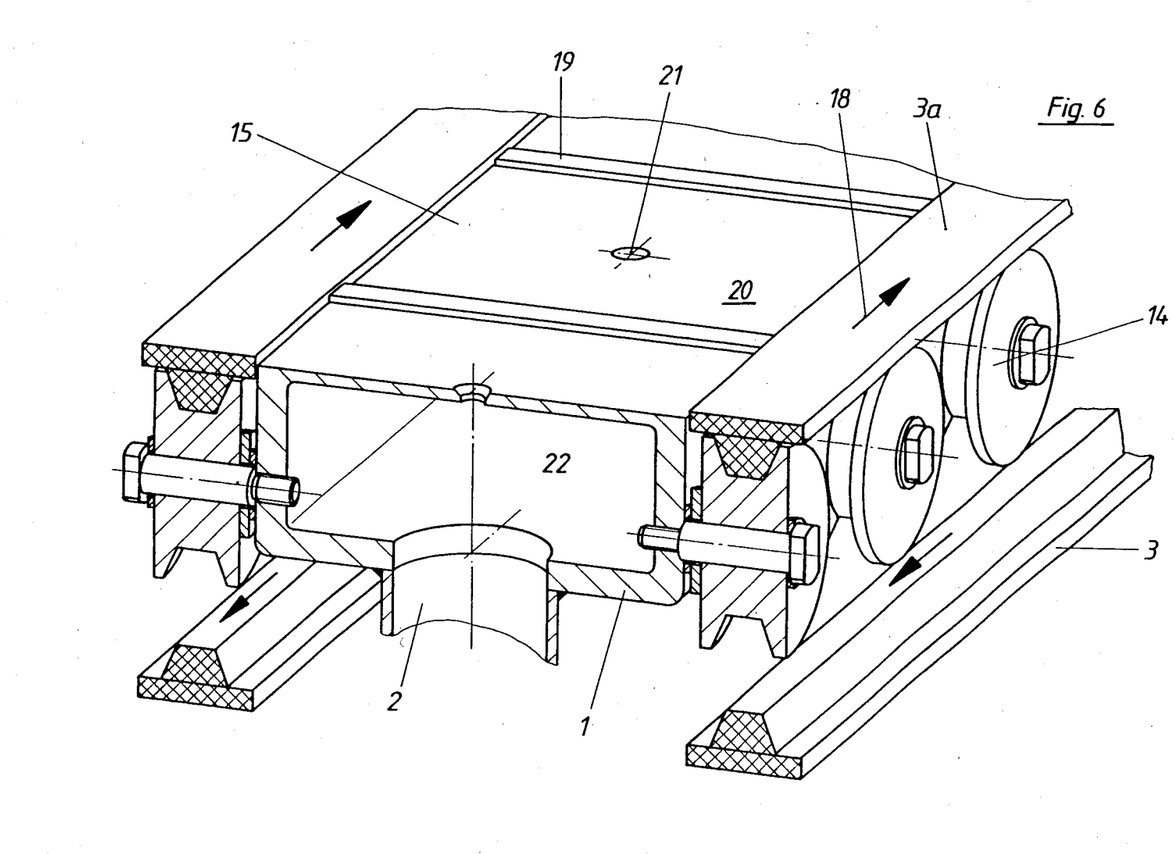
FIG. 6 is a perspective view showing a portion of the conveying apparatus of FIG. 1.

Providing a labyrinth seal by longitudinal grooves 50 and 55 of the beam 1 which face the respective side and forward faces of the adjacent working courses 3a of the belts 3 of the plane of travel, resp., (as shown in FIG. 4a) increases the resistance of flow by air into the vacuum channel 15, and so improves the sealing effect. In the case where side walls 51 project beyond the forward surface 17 of the box-section beam 1 to form side ribs 52 thereon, similar grooves 53 and 54 can be provided in the surface of the side ribs which adjoin the working course of the belt 3 in the forward surface of the ribs 52, resp., which face the plane of travel 6.

Figures 7, 7A, 8:
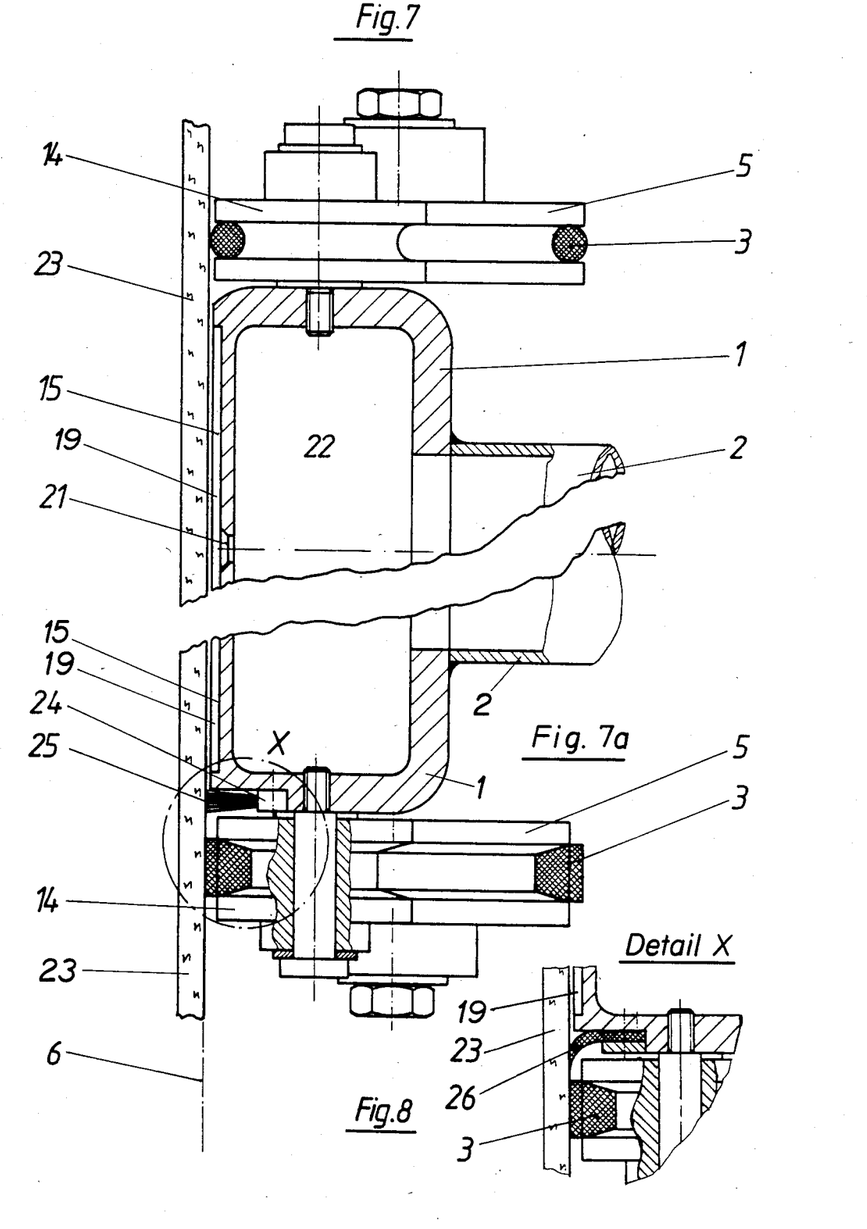
FIG. 7 and 7a are sectional views which are similar to FIG. 4 and show parts of modified conveying apparatus.
FIG. 8 illustrates a modification of the detail which is shown in FIG. 7 in the circle X.

Separate sealing elements may be provided between the vacuum channel 15 and the working course 3a of each belt 3 in order to laterally seal the vacuum chambers 20. An example of such an additional sealing element is shown in FIG. 7a. In that illustrative embodiment the box-section beam is formed on the outside with a step, to which a bar 24 is secured, which carries bristles 25, which are directed toward the plane of travel 6 and extend at least as far as to said plane of travel and in a relaxed state preferably protrude beyond the plane of travel to a small extent so that the bristles will apply a slight pressure to an article being conveyed, which may consist of a glass plate 23. The seal provided by said additional sealing elements will obviously depend on the spacing of the bristles 25.

Alternative additionally sealing means are shown in FIG. 8 and comprise longitudinally extending, elastic sealing lips 26, which are secured to respective sides of the box-section beam 1 and are secured to the latter and directed toward the plane of travel 6 and in a relaxed state protrude beyond said plane of travel. Each sealing lip 26 is curved toward the adjacent belt 3 so that the sealing lip bears under an initial stress on the glass plate 23 being conveyed and is forced against the glass plate 23 by an additional force owing to the vacuum which is established in the vacuum passage 15.

Figure 3:
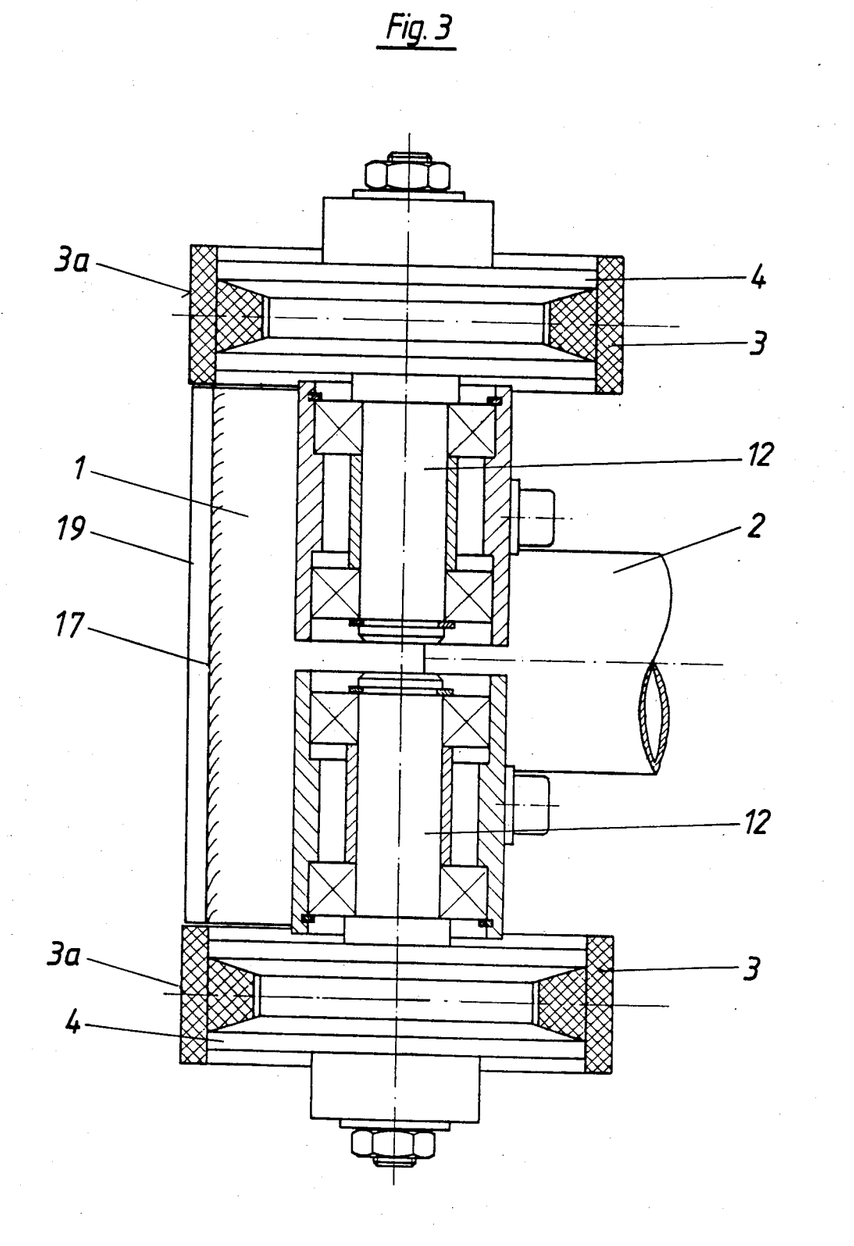
FIG. 3 is a sectional view taken on line III—III in FIG. 1.

FIGS. 7 and 7a show also that the shape of the belts 3 in cross-section may differ from that shown in FIGS. 3 and 4. The belt may simply be circular in cross-section, as is shown in FIG. 7. It will be more desirable, however, to provide a vee belt, such as is shown in FIGS. 7a and 8, which differs from the vee belt shown in FIGS. 3 and 4 in that it is not tee-shaped in cross-section but the crosspiece of the tee has been omitted. Such simpler belts cannot seal the vacuum channel 15 on its longitudinal sides as effectively as the tee-shaped vee belt shown in FIGS. 3 and 4 and for this reason they are desirably used each in combination with an additional sealing element 24 or 26 such as is shown in of FIG. 7a and in FIG. 8.

FIGS. 7 and 7a show also that the box-section beam 1 may have different shapes at its forward longitudinal edges. In the one embodiment (FIG. 7a) it has sharp right-angled edges. In the embodiment shown in FIG. 7 the forward edge of the beam is slightly rounded. Sharp edges will desirably provide a somewhat higher resistance to flow so that a seal is effected.

In all embodiments shown in FIGS. 1 to 7a, each crossrib 19 registers with an axis of a backing roller 14.

Figure 1:
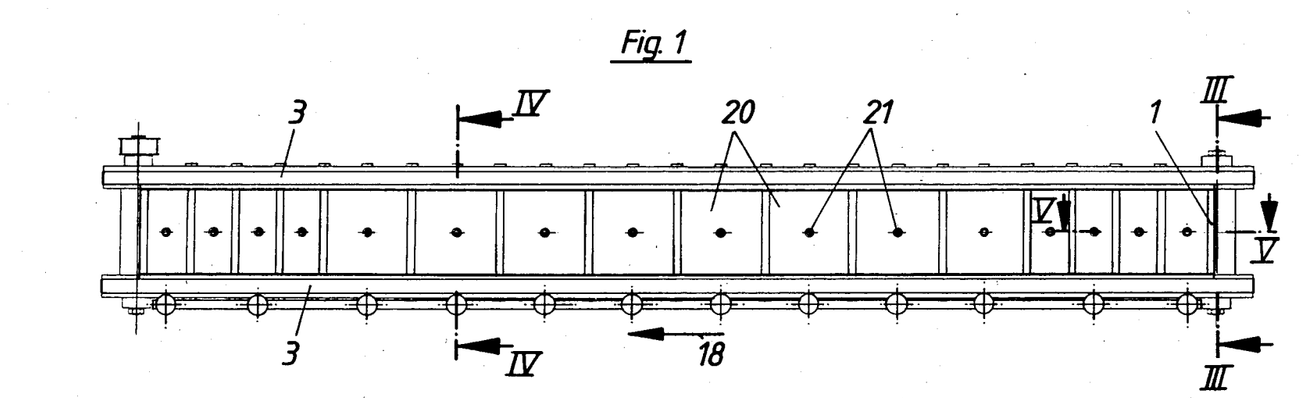
FIG. 1 is a front elevation showing conveying apparatus.
Figure 2:
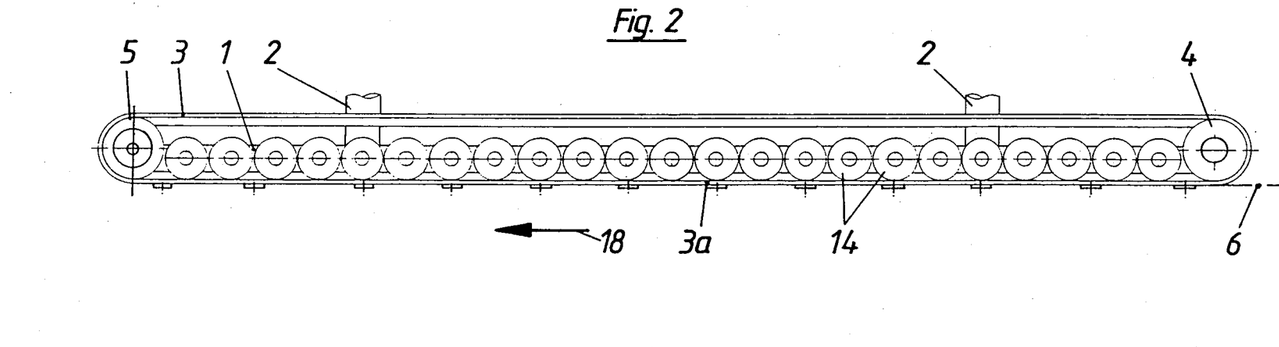
FIG. 2 is a top plan view showing conveying apparatus of FIG. 1.
Figure 9:
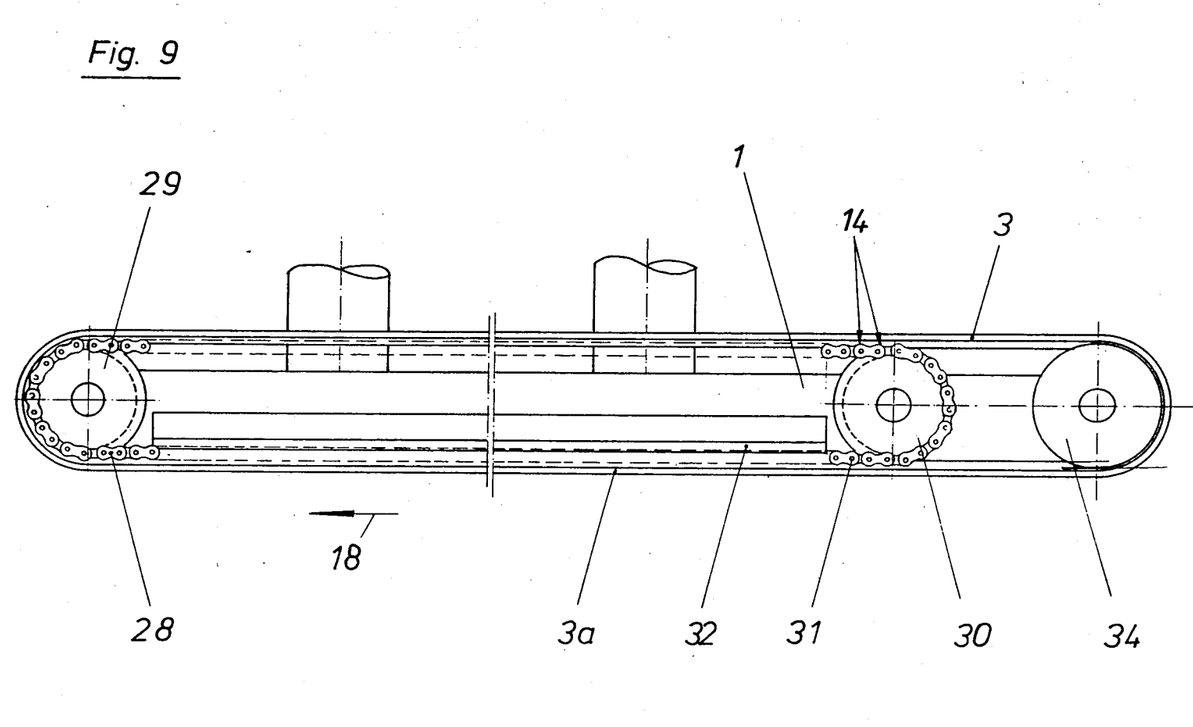
FIG. 9 is a view that is similar to FIG. 2 and shows a modified conveying apparatus in which each belt is supported by a roller chain rather than by individually mounted rollers.
Figure 10:
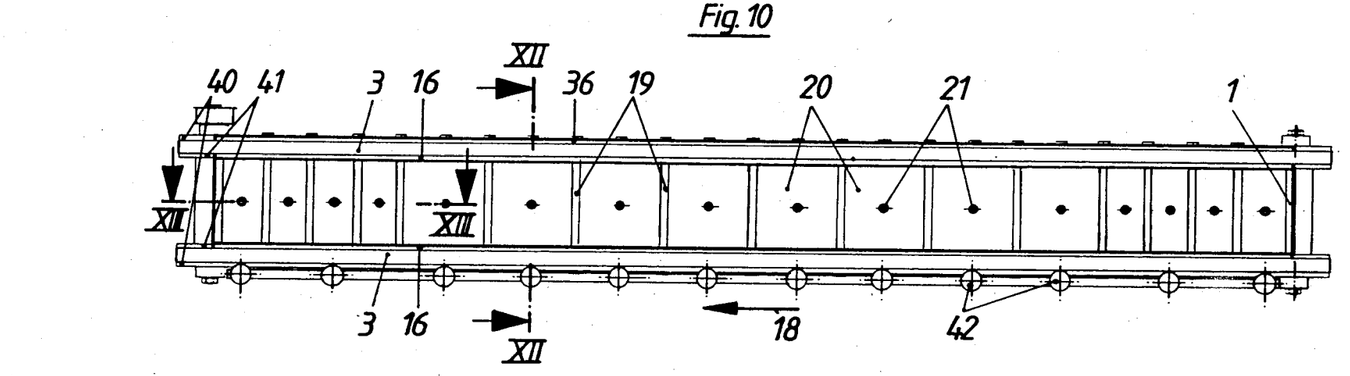
FIG. 10 is a front elevation showing another embodiment of a conveying apparatus.
Figure 11:
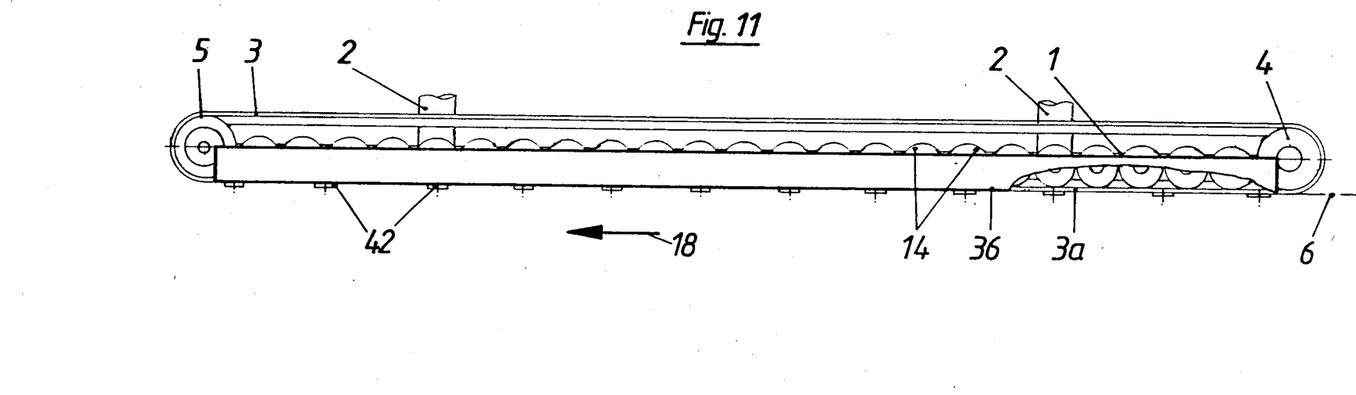
FIG. 11 is a top plan view showing the conveying apparatus of FIG. 10.

The embodiment of the conveying apparatus shown in FIG. 9 differs from the embodiment shown in FIG. 2 in that the belts 3 are backed by a roller chain 28 rather than by rollers 14 which are individually mounted on the box-section beam 1. The roller chain 29 is trained around chain sprockets 29 and 30 and is tensioned. Between the chain sprockets 29 and 30 the forward course 31 of the chain is supported at its link plates 33 on the rear on a bar 32, which is rigidly connected to the box-section beam 1 and is parallel to the latter. A belt 3 which is tee-shaped in cross-section and has a leg which extends between the link plates 33 of the chain lies on the roller chain 28 and together with the latter is trained around the chain sprocket 29. But the belt 3 is somewhat longer than the roller chain 28 and at that end which is opposite to the chain sprocket 29 extends beyond the roller chain and at that end is trained around a driven belt pulley 34. To permit the belt 3 and the roller chain 28 to be tensioned independently of each other, the chain sprockets 29 and 30 are independently adjustable along the box-section beam 1. The chain sprocket 29 can be displaced away from the chain sprocket 30 to tension the chain 28 and the belt 3 at the same time. The chain sprocket 30 can be displaced away from the chain sprocket 29 to tension the roller chain independently of the belt 3.

The illustrative embodiment shown in FIGS. 10 to 13 differs from the embodiments shown in FIGS. 1 to 6 essentially in the design of the belts, in the means for sealing the vacuum channel, in the provision of backing rollers for the article being conveyed, and in the provision of valve members behind respective suction ports of the box-section beam 1. In other respects the embodiments are highly similar and identical features will not be described in detail once more but will be apparent from their above description given with reference to FIGS. 1 to 6.

In the illustrative embodiment shown in FIGS. 10 to 13, the vacuum channel 15 provided on the forward side of the box-section beam is defined by side ribs 16, which are constituted by angle-section bars, which at that flange which is at right angles to the plane of travel 6 are secured to the side of the box-section beam 1 whereas the other flange is parallel to and close to the plane of travel 6 and extends away from the box-section beam 1. The vacuum channel 15 is divided in lengths by crossribs which extend transversely to the direction of travel 18 and have an outside surface which is coplaner with the outside surfaces of the side ribs 16 which are about 0.5 mm to 0.8 mm behind the plane of travel 6.

Another angle-section bar 36 is disposed above the box-section beam 1 and has a flange that is at right angles to the plane of travel 6 and disposed above the rollers 14 which back the working course 3a of the upper belt 3. That flange of the bar 36 is secured to the axles of the rollers 14. The other flange of the bar 36 is parallel to the plane of travel 6 and extends toward the box-section beam 1 and has a forward surface which is also disposed on the rear of and closely spaced from the plane of travel 6.

In the present embodiment each belt 3 is a vee belt that is tee-shaped in cross-section and on each side of the vee-shaped leg is provided on the underside of the crosspiece of the tee with a series of teeth 37. Each belt 3 is formed at the center of its forward surface with a longitudinally extending, protruding rib 38, which is narrower than the belt 3. On each side of the rib 38, the belt 3 is formed with a step 39, which extends to a setback marginal strip 40 or 41. The rib 38 of the working course 3a of each belt defines the plane of travel 6. The width of the ribs 38 and the distance between the side rib 16 and the bar 36 are so matched that there are only small lateral clearances between each rib 38 and those flanges of the side rib 16 and the bar 36 which are parallel to the plane of travel 6. The rib 38 slightly protrudes from the forward surfaces of the side ribs 16 and bar 36 and the two marginal strips 40 and 41 of the belt 3 bear on the rear surfaces of the side ribs 16 and bar 36.

Figure 12:
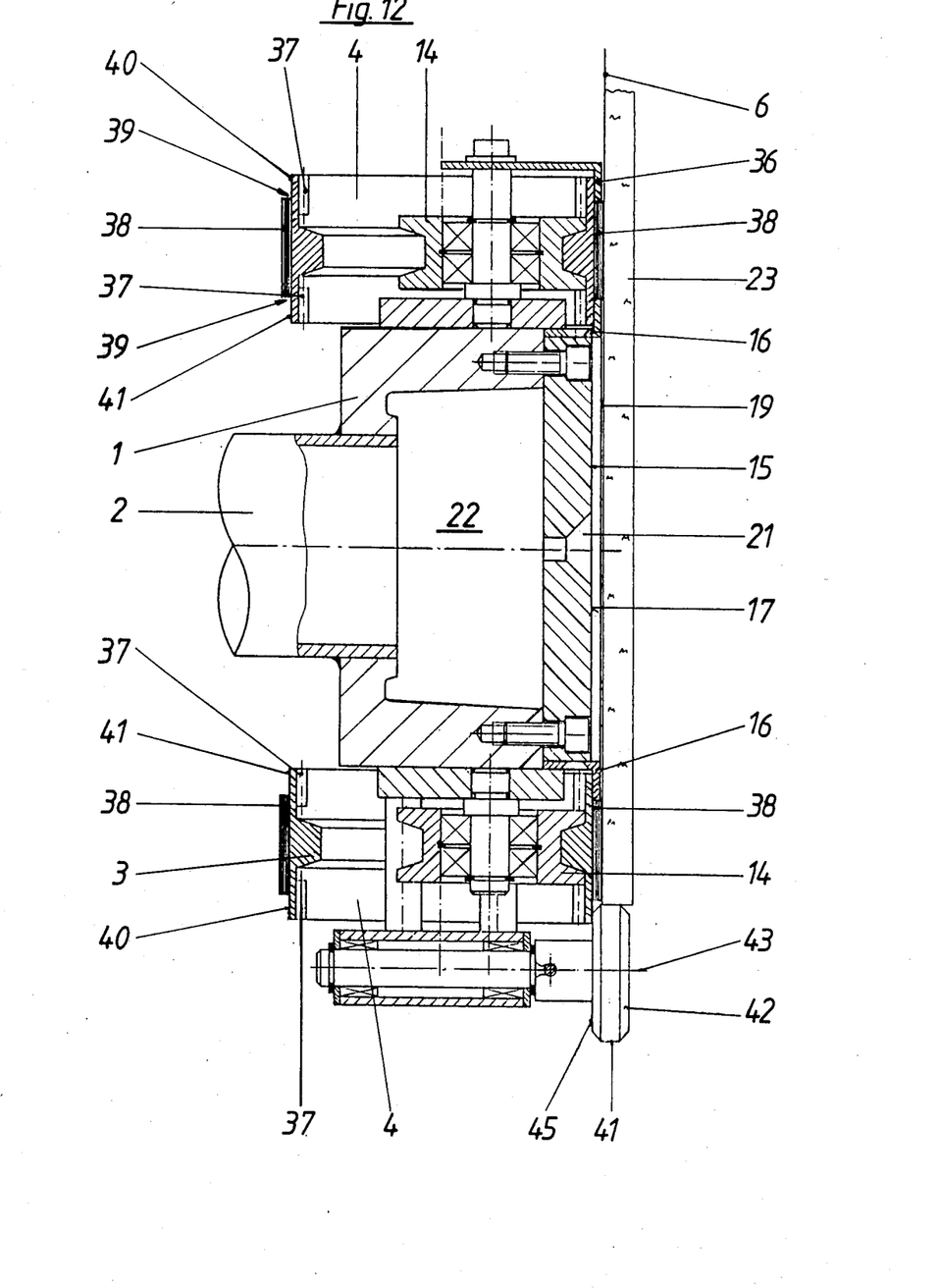
FIG. 12 is a sectional view taken on line XII—XII in FIG. 10.

Associated with the belt 3 that is shown in FIG. 12 below the box-section beam 1 is only a side rib 16 which is identical to and has the same function as the corresponding side 16 disposed above the box-section beam 1. The additional bar 36 provided in accordance with FIG. 12 above the box-section beam has been omitted below the beam 1 and replaced by a plurality of rollers 42, which are arranged in a row and rotatable about axes 43 which are at right angles to the plane of travel, are provided below the rollers 14 disposed below the box-section beam 1. A major portion of the peripheral surface of the rollers 42 is disposed in front of the plane of travel 6 and that side face 45 of each roller 42 which is disposed behind the plane of travel 6 has a portion which is in contact with and backs the lower marginal strip 41 of the working course 3a of the belt 3. The rollers 42 serve also to support the articles being conveyed, which in the present example consist of glass plates, and the rollers 42 are preferably freely rotatable.

Figure 13:
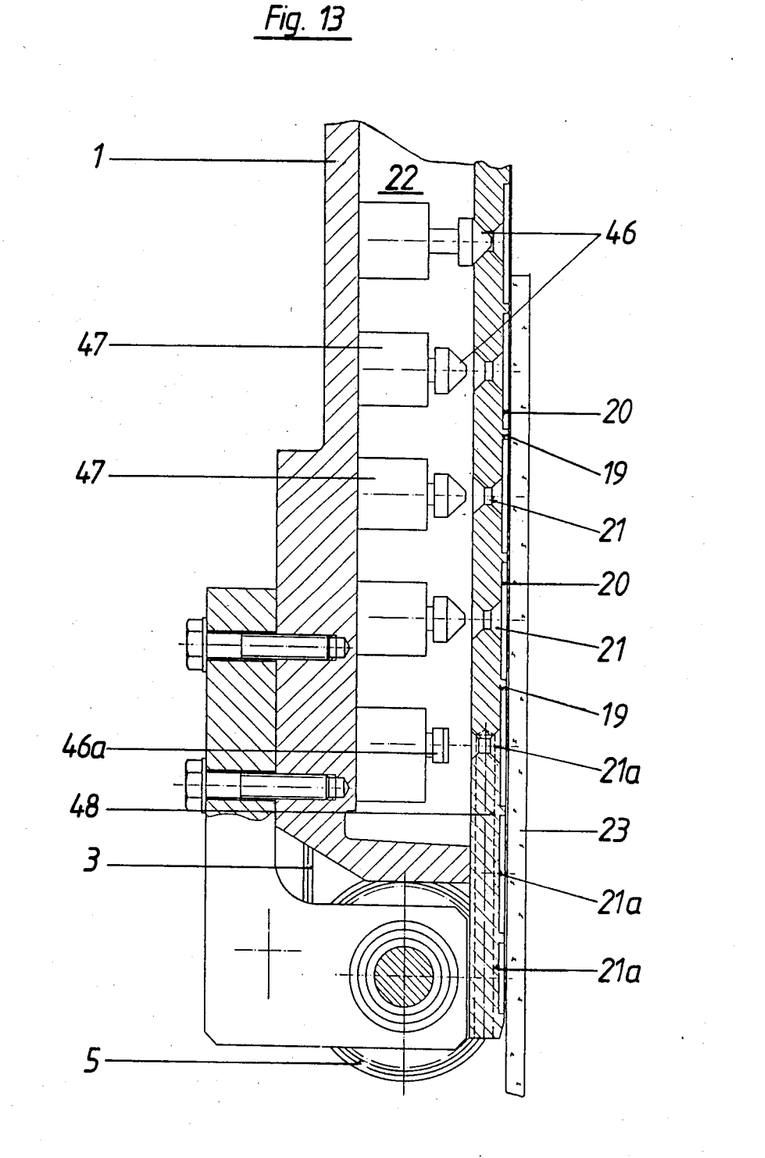
FIG. 13 is a sectional view taken on line XIII—XIII in FIG. 10.

It is apparent from FIG. 13 that the belt 3 is trained at one end of the box-section beam around a driven toothed belt pulley 5'. FIG. 13 shows also valve cones 46, which are disposed inside the box-section beam 1 behind respective suction ports 21. The valve cones 46 are operable independently of each other by short-stroke pneumatic cylinders 47 and serve to close those of the suction ports which at a given time are not covered by a glass plate 23 being conveyed. For that purpose the short-stroke cylinders may be controlled by sensors which indicate the presence or absence of a discrete article in front of a suction port. Alternatively the short-stroke cylinders 47 may be controlled by a computer-assisted programmed controller. The three suction ports 21a disposed at the end of the box-section beam cannot be closed independently of each other because the required space is not available. Said three vacuum openings 21a are interconnected by a passage 48 and are jointly closed by a valve member 46a.

I claim:

1. In apparatus for a slipless conveyance of discrete articles, particularly of glass plates in a predetermined direction of travel, comprising
   an elongate carrier, which extends in said direction of travel and has a forward side and is provided on said forward side with a vacuum channel, which is forwardly open and has at least one suction port,
   a vacuum source communicating with said suction port,
   two parallel endless belts, which extend on opposite sides of said vacuum channel in said direction of travel and comprise each a working course, which has a forward surface, said forward surfaces extending substantially in a common plane of travel and being adapted to contact one of said discrete articles so as to receive all the suction force exerted on the discrete articles, and which working courses are so arranged with respect to the vacuum channel that they form sealing elements to laterally seal the vacuum channel where it is covered by the discrete articles, and
   drive means operable to move both said belts in said direction of travel at the same velocity, and a plurality of backing rollers are provided, which are in contact with said working course of each of said belts on the rear thereof.

2. The improvement set forth in claim 1 as applied to apparatus in which said forward surfaces of said working courses define a vertical plane of travel.

3. The improvement set forth in claim 1 as applied to apparatus in which said forward surfaces of said working courses define an approximately vertical plane of travel.

4. The improvement set forth in claim 1, wherein
   said carrier comprises two side walls, which extend on opposite sides of said carrier in said direction of travel,
   said vacuum channel is laterally defined by said belts and
   said working course of each of said belts has a side face which faces said vacuum channel and adjoins the adjacent one of said side walls, wherein the belts which adjoin the adjacent side walls are arranged so that the adjacent lateral surface of the resective belt faces the opposite side wall.

5. The improvement set forth in claim 4, wherein each of said side walls has a surface which adjoins the working course of one of said belts and is formed with grooves which extend in said direction of travel and are open to said side face of said working course to form a labyrinth seal therewith.

6. The improvement set forth in claim 4, wherein each of said side walls has a forward surface which faces said plane of travel and is formed with grooves extending in said direction of travel so that said forward surface of said side wall is adapted to form a labyrinth seal with a discrete article contacting said forward surfaces of said working courses.

7. The improvement set forth in claim 1, wherein
said carrier is provided on its forward side with two side ribs, which define said vacuum channel on opposite sides thereof and protrude toward but are spaced from said plane of travel, and
said working course of each of said belts extends along and forwardly beyond the adjacent one of said side ribs on that side thereof which is opposite to said vacuum passage.

8. The improvement set forth in claim 7, wherein each of said side ribs has a surface which adjoins the working course of one of said belts and is formed with grooves which extend in said direction of travel and are open to said side face of said working course to form a labyrinth seal therewith.

9. The improvement set forth in claim 7, wherein said side ribs have forward surfaces which are spaced between 0.5 mm and 0.8 mm from the plane of travel at the rear thereof.

10. The improvement set forth in claim 7, wherein said side ribs are spaced from said plane of travel.

11. The improvement set forth in claim 9, wherein each of said side ribs has a forward surface which faces said plane of travel and is formed with grooves extending in said direction of travel so that said forward surface of said side rib is adapted to form a labyrinth seal with a discrete article contacting said forward surfaces of said working courses.

12. The improvement set forth in claim 10, wherein said side ribs include a flange which extends adjacent one of said belts,
each of said belts is formed on that surface which constitutes said forward surface of said working course with a step, which extends along said belt and defines on said forward surface of said working course a first portion which defines said plane of travel and a setback marginal strip, which is in contact with the adjacent one of said flanges on the rear surface.

13. The improvement set forth in claim 12, wherein
each of said belts is formed on that surface which constitutes the forward surface of said working course with two transversely spaced apart steps, which extend along said belt and define on the surface of said belt an intermediate rib having a forward surface defining said plane of travel and two marginal strips on opposite sides of said intermediate rib,
one of said marginal strips is in contact with the adjacent one of said flanges on the rear thereof,
said carrier is further provided with two bars, which extend in said direction of travel and each of which extends along one of said belts on that side thereof which is remote from said vacuum channel,
each of said bars has a forward surface which adjoins but is spaced from said plane of travel,
each of said bars is spaced from the adjacent flange extending adjacent one of said belts by a distance which is larger than the width of the intermediate rib of said adjacent belt and smaller than the width of said adjacent belt, and
that marginal strip of each of said belts which is remote from said vacuum channel is in contact with the adjacent one of said bars on the rear thereof.

14. The improvement set forth in claim 12, wherein
each of said belts is formed on that surface which constitutes the forward surface of said working course with two transversely spaced apart steps, which extend along said belt and define on the surface of said belt an intermediate rib having a forward surface defining said plane of travel and two marginal strips on opposite sides of said intermediate rib,
one of said marginal strips is in contact with the adjacent one of said flanges on the rear thereof,
a plurality of confining rollers having axes extending at right angles to said plane of travel are arranged in a row extending in said direction of travel on that side of each of said belts that is remote from said vacuum channel,
each of said confining rollers has a peripheral surface extending in front of said plane of travel,
each of said confining rollers has a rear end face which is disposed behind said plane of travel and in contact with the adjacent marginal strip of the adjacent one of said belts.

15. The improvement set forth in claim 12, wherein said first portion of said forward surface of said working course has a higher coefficient of friction than said marginal strip.

16. The improvement set forth in claim 1, wherein
said carrier is provided on its forward side with a plurality of crossribs, which extend in said vacuum channel transversely to said direction of travel and adjoin said plane of travel and subdivide said vacuum channel into a plurality of vacuum chambers, and
each of said vacuum chambers communicates through at least one of said suction ports with said vacuum source.

17. The improvement set forth in claim 16, wherein
each of said rollers has an axis of rotation which is parallel to said plane of travel and at right angles to said direction of travel and
each of said crossribs is so arranged that a plane which is at right angles to said plane of travel and includes the longitudinal center line of said crossrib contains also the axis of rotation of one of said backing rollers associated with each of said belts on each side of said vacuum channel.

18. The improvement set forth in claim 16, wherein
said carrier comprises two side walls, which extend on opposite sides of said carrier in said direction of travel,
said vacuum channel is laterally defined by said belts,
said working course of each of said belts has a side face which faces said vacuum channel and adjoins the adjacent one of said side walls.

19. The improvement set forth in claim 16, wherein
said carrier is provided on its forward side with two side ribs, which define said vacuum channel on opposite sides thereof and protrude toward but are spaced from said plane of travel,
said working course of each of said belts extends along and forwardly beyond the adjacent one of said side ribs on that side thereof which is opposite to said vacuum passage, and
said side ribs and said crossribs have forward surfaces lying in a common plane.

20. The improvement set forth in claim 16, wherein said crossribs have forward surfaces which are spaced 0.5 mm and 0.8 mm from said plane of travel at the rear thereof.

21. The improvement set forth in claim 16, wherein
a plurality of valve members are provided in said carrier and are in register with respective ones of said suction ports and disposed on that side thereof which is opposite to said vacuum channel, and
said valve members are operable independently of each other to open and close said suction ports.

22. The improvement set forth in claim 1, wherein said vacuum passage has a depth between 5 mm and 10 mm, measured from said plane of travel.

23. The improvement set forth in claim 1, wherein said vacuum channel has a depth of about 8 mm, measured from said plane of travel.

24. The improvement set forth in claim 1, wherein said backing rollers contacting each of said working courses are closely spaced apart in said direction of travel.

25. The improvement set forth in claim 1, wherein said rollers consist of belt pulleys.

26. The improvement set forth in claim 1, wherein
said backing rollers contacting each of said working courses are incorporated in a roller chain, which comprises a forward course adjacent to said working course and a rear course remote from said working course,
each of said roller chains has link plates which are wider than said backing rollers and interconnect the same,
two rails are provided, which extend in said direction of travel behind each of said roller chains and are rigidly connected to said carrier, and
said link plates of said forward course of each of said chains bear on one of said rails.

27. The improvement set forth in claim 26, wherein each of said belts has in cross-section the shape of a tee which has a crosspiece that is wider than the associated roller chain.

28. The improvement set forth in claim 1, wherein said belts are vee belts.

29. The improvement set forth in claim 1, wherein said belts are tee-shaped in cross-section.

30. The improvement set forth in claim 1, wherein each of said belts has in cross-section the shape of a tee which has a crosspiece that is wider than the associated backing rollers.

31. The improvement set forth in claim 1, wherein
each of said belts has in cross-section the shape of a tee having a crosspiece and a leg,
each of said belts consists of a toothed belt which is formed with teeth on said crosspiece, and
each of said belts is trained around a driven belt pulley having teeth in mesh with said teeth of said belt.

32. The improvement set forth in claim 31, wherein said teeth of each of said belts are formed on said crosspiece in two transversely spaced apart rows on opposite sides of said leg.

33. The improvement set forth in claim 31, wherein said backing rollers are toothless.

34. The improvement set forth in claim 32, wherein the width of said backing rollers equals the distance between said rows of teeth.

* * * * *